P. A. OLIVER.
BLASTING-CARTRIDGE.
No. 176,989. Patented May 2, 1876.
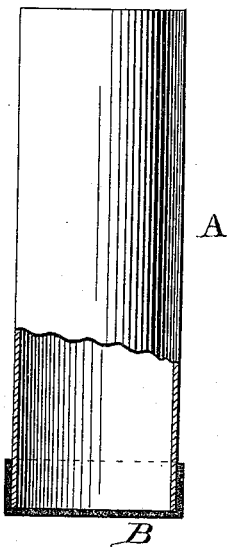
WITNESSES
Henry N. Miller
F. L. Durand
By
INVENTOR
Paul A. Oliver
Alexander Mason
Attorneys

UNITED STATES PATENT OFFICE.

PAUL A. OLIVER, OF WILKESBARRE, PENNSYLVANIA.

IMPROVEMENT IN BLASTING-CARTRIDGES.

Specification forming part of Letters Patent No. 176,989, dated May 2, 1876; application filed March 6, 1876.

*To all whom it may concern:*

Be it known that I, PAUL A. OLIVER, of Wilkesbarre, in the county of Luzerne and in the State of Pennsylvania, have invented certain new and useful Improvements in Blasting-Cartridges; and do hereby declare that the following is a full, clear, and exact description thereof, reference being had to the accompanying drawing, and to the letters of reference marked thereon, making a part of this specification.

My invention relates to blasting-cartridges; and it consists in a case or cylinder provided at its lower end with a rubber cup fastened thereto, as will be hereinafter more fully set forth.

In order to enable others skilled in the art to which my invention appertains to make and use the same, I will now proceed to describe its construction and operation, referring to the annexed drawing, which represents a side view of my cartridge-case with the lower end in vertical section.

A represents the case or cylinder made of paper, and provided at its lower end with a cup, B, of rubber, inclosing said end and forming the bottom for the same. This cup may be put on the end of the cylinder while hot, and thus stick to the same, or it may be fastened by glue or other adhesive substance, or in any manner deemed most advantageous and expeditious. I may also simply dip the end of the case A in a solution of rubber of such consistency that when dry it forms such rubber cup.

By having the base of the cartridge covered with an india-rubber cup, that part of the cartridge is made water-proof, and when the same is inserted in the orifice made, the force of the powder is not destroyed or weakened, as would be the case where the material of which the cartridge is made is surrounded by a metallic cup, or has a metallic cup within it, which would allow a limited space between the metal and the cartridge material for the moisture to penetrate.

Having thus fully described my invention, what I claim as new, and desire to secure by Letters Patent, is—

In blasting-cartridges, the case or cylinder A, provided at its lower end with a rubber cup, B, fastened thereto, substantially as herein set forth.

In testimony that I claim the foregoing I have hereunto set my hand this 6th day of March, 1876.

PAUL A. OLIVER.

Witnesses:
CHAS. P. HUNT,
GEO. H. KEETS.